US006826259B2

(12) United States Patent
Hoffman

(10) Patent No.: US 6,826,259 B2
(45) Date of Patent: Nov. 30, 2004

(54) METHOD FOR EMULATING A TERMINAL AND TEST APPARATUS FOR TESTING A TELECOMMUNICATION NETWORK

(75) Inventor: Holger Hoffman, Vogelkirschenring (DE)

(73) Assignee: Tektronix International Sales GmbH, Schaffhausen (CH)

( * ) Notice: Subject to any disclaimer, the term of this patent is extended or adjusted under 35 U.S.C. 154(b) by 59 days.

(21) Appl. No.: 09/996,526

(22) Filed: Nov. 28, 2001

(65) Prior Publication Data

US 2002/0128811 A1 Sep. 12, 2002

(30) Foreign Application Priority Data

Dec. 19, 2000 (EP) .............................................. 00127825

(51) Int. Cl.[7] .......................... H04M 1/24; H04M 3/08; H04M 3/22
(52) U.S. Cl. ....................... 379/10.03; 379/1.01; 379/9; 379/26.01; 379/27.02; 379/29.02
(58) Field of Search ........................ 379/1.01, 9, 10.01, 379/10.02, 10.03, 15.03, 26.01, 26.02, 27.01, 27.02, 27.04, 29.01, 29.02; 714/1, 3, 36, 47, 52

(56) References Cited

U.S. PATENT DOCUMENTS

| 5,623,498 | A | * | 4/1997 | Pannone ...................... 714/712 |
| 5,715,373 | A |   | 2/1998 | Desgrousilliers et al. |
| 5,787,147 | A | * | 7/1998 | Gundersen ................ 379/10.01 |
| 5,793,751 | A | * | 8/1998 | Baker et al. .................. 370/250 |
| 5,809,108 | A | * | 9/1998 | Thompson et al. ....... 379/15.01 |
| 6,430,266 | B2 | * | 8/2002 | Gershon ....................... 379/22 |
| 6,493,425 | B1 | * | 12/2002 | Abe ........................... 379/1.01 |

FOREIGN PATENT DOCUMENTS

| EP | 0589576 | 3/1994 |
| EP | 0608614 | 8/1994 |

OTHER PUBLICATIONS

Werner Rosar, "Testing Keeps Pace with Network Evolution", Siemens AG, 1995, pp. 32–34.

P. Goyer & J. Radureau, "GENEPX400—A Test System for X.400 Based Message Handling Systems", Computer Standards & Interfaces 1988, pp. 103–109.

W. Kirchner & P. Wagner, "ISDN D Channel Protocol Simulator", Electrical Communication vol. 61, No. 1, 1987, pp. 97–103.

* cited by examiner

Primary Examiner—Quoc Tran
(74) Attorney, Agent, or Firm—Francis I. Gray

(57) ABSTRACT

A method for emulating a terminal for testing a telecommunication network has the terminal being assigned a user interface programmable by a user for executing a communication sequence, the programming of the user interface having first of all the provisioning of a multitude of keywords from which the communication sequence for the terminal is compiled, a program code being correlated with each keyword. Moreover, an entry mask on a display device is provided into which the user enters a series of at least two keywords for compiling the communication sequence. Finally, the program codes that are correlated with the keywords entered into the entry mask by the user are linked to give an executable program. A test apparatus for testing the telecommunication network has a storage device in which the keywords are filed and from which the communication sequence is compiled for participation in the communication, with the program code being correlated with each keyword. The apparatus also has a display device with an entry mask into which the user enters a series of at least two keywords for compiling the communication sequence. Finally the apparatus has a compiling device in which the program codes, which are correlated with the keywords entered into the entry mask by the user, are linked to give the executable program.

10 Claims, 4 Drawing Sheets

METHOD FOR EMULATING A TERMINAL AND TEST APPARATUS FOR TESTING A TELECOMMUNICATION NETWORK

BACKGROUND OF THE INVENTION

The present invention relates to the testing of telecommunication networks, and more particularly to a method for emulating a terminal for testing a telecommunication network and to a corresponding test apparatus for testing a telecommunication network.

In telecommunication networks, particularly also in open communication systems, digital data are usually transmitted according to specified rules. One form of such rules are so-called protocols. For testing telecommunication networks, test apparatuses, often so-called protocol testers, are used that can be configured with respect to the protocol used in the network. Examples include the protocols GSM, ISDN, GPS, UMTS, CDMA, ISUP.

To outline the problem underlying the invention, the following will first explain a protocol tester known from the state of the art, sold by the applicant of the present application under the name Tektronix K1297. To test a telecommunication network, the protocol tester is connected to said telecommunication network. The term "test" comprises very different forms of testing, only one of which, however, will be looked at in detail below. The K1297 referred to above comprises a screen on which the user can create a test scenario. A test scenario is entered using the keyboard and/or the computer mouse. FIG. 1 shows a user interface known from the K1297, the so-called Diagram View, as can be seen from the bottom left-hand corner of FIG. 1. In a top area and a right-hand area of the user interface there are icons, which by clicking on them lead to menus being opened in the known manner that support the user in setting up a test scenario. Since they are of secondary importance for the following, they are not described here in greater detail.

The architecture model for so-called open communication systems was developed by the International Standardization Organization, ISO. The OSI (Open Systems Interconnection) reference model breaks down the necessary functions into a hierarchical layer structure. It is this layer structure which the setting-up of a test scenario in a protocol tester has to follow. In FIG. 1 the so-called protocol stack created by a user is marked 12, this figure showing as an example a protocol stack for testing a communication organized according to the ISDN protocol. A bottom-most layer 14 serves to take into account layer 1, i.e., the bit transfer layer (physical layer) and the transmission medium including the cables, cable ports, etc. used. This is followed by several layers, 16, depending on which layer level the test is to take place. In the present example a second layer (isdnl2= ISDN Layer 2) 16a and a third layer (isdnl3) 16b are shown. The suffix "–te" at the third layer 16b indicates that in the present case the terminal side is to be emulated by the protocol tester (te=terminal), it also being possible for a protocol tester of this kind to be used for emulating the network side, which would then be marked by a suffix "–et." The third layer 16b is followed by the ISDN terminal layer 18, which provides an adaptation to the third layer 16b located below it, and to a user interface (USIM) 20 located above it. Via the user interface 20 test scenarios desired by a user may be entered into the protocol tester, particularly by designing so-called terminals, one of which is in each case assigned to the test communication. For each user interface 20 up to 240 terminals may be programmed. The user interface is assigned a terminal layer 18.

Although FIG. 2 already exhibits features of the present invention, the user interface Parameter View 22 shown, particularly its left-hand window 24, may serve to describe further the setting up of a test with the known protocol tester K1297. As can be seen from said window 24 the protocol tester in the protocol stack to be emulated includes the emulation of layer 14 of layer 16a, of layer 16b and of the terminal layer 18. The user interface 20 allows general specification data to be given in a menu item (general) 22 and the traffic taking place on the communication network to be specified in a menu item (traffic profile) 25. A menu item (users) 26 allows the behavior of the terminals (terminals) involved in the communication to be specified. It is possible to specify that all terminals execute the same test, i.e., have the same test communication sequence, see menu item 28, and/or individual terminals or groups of terminals may be assigned other communication sequences. For this purpose, menu items U1_10, U11_30, U31_60, U61_100 and U101_240 are given, with U meaning user=terminal and the numbers corresponding to the associated terminals numbered consecutively. In the case shown in FIG. 2, terminal 1 (see dark background of menu item 30) is to be assigned a test communication sequence.

The user may now choose between manual and automatic execution of a test. With reference to FIG. 2, in the top right-hand window 32 the manual mode may be selected via menu item 34. In the manual mode actions may be selected via other menu items, such as menu item 36 (offhook=lift [a receiver]) and menu item 38 (onhook=put down [a receiver]). When the relevant menu item is clicked, the respective action is executed for the specified terminal 30. Special functions may be entered via a menu item 40 (feature button). Via a menu item 42 the automatic mode may be selected. In the state of the art, with K1297 in its known embodiment, one of two firmly specified test scenarios may be chosen in the automatic mode: in the first scenario a terminal offhooks, makes a call on its own within a specified period of time, waits a specified period of time, and then onhooks. After a specifiable period of time the test starts anew. In the second firmly specified test scenario, a terminal is called, offhooks after a specified period of time, and onhooks after a specifiable time. A time period after which this sequence is repeated may be set.

The disadvantage of this solution is that the two firmly specified test scenarios, which may be selected in the automatic mode, are sufficient for some test cases, but some wishes remain unsatisfied. For supplementary services, for example, such as 'call waiting' or 'brokers call', there are no sufficient test opportunities. Also, defective calls, when only a part of the number is dialled, cannot be simulated in the automatic mode.

Running such tests in the manual mode would be extremely complex and time-consuming to program, particularly for several terminals in the test communication network, so that there is no realistic way of running the mentioned tests. However, plausible statements concerning the operability of a communication network may only be made if the tests to be executed come close to the conditions encountered in actual practice. It is particularly important to determine the maximum load carrying capacity of a telecommunication network. This is the only way to determine up to which limit the operability of the telecommunications network can be guaranteed.

What is desired is a method for emulating a terminal for testing a communication network which significantly expands the possibilities of the tests to be executed as well as a corresponding test apparatus.

BRIEF SUMMARY OF THE INVENTION

Accordingly the present invention provides a method for emulating a terminal for testing a communication network, said terminal being assigned a user interface programmable by the user for executing an automatic communication sequence, a large number of keywords being made available for programming said user interface from which a communication sequence of at least one terminal in the automatic communication sequence may be compiled, each keyword having a program code correlated with it. Also, an entry mask is provided on a display device into which a user may enter a series of at least two keywords to compile the communication sequence of the at least one terminal. Finally, the program codes that are correlated with the keywords entered into the entry mask by a user are linked to an executable program. A test apparatus for testing a telecommunication network has a storage device in which keywords are filed from which a communication sequence of at least one terminal in a communication may be compiled, and the program code correlated with each keyword. Moreover, the apparatus has a display device with an entry mask into which a series of at least two keywords may be entered by a user for compiling the communication sequence of the at least one terminal. Moreover, the apparatus features a compiling device in which the program code, which is correlated with the keywords entered into the entry mask by the user, may be linked to give an executable program.

The objects, advantages and other novel features of the present invention are apparent from the following detailed description when read in conjunction with the appended claims and attached drawing.

DETAILED DESCRIPTION OF THE INVENTION

Figure 1:
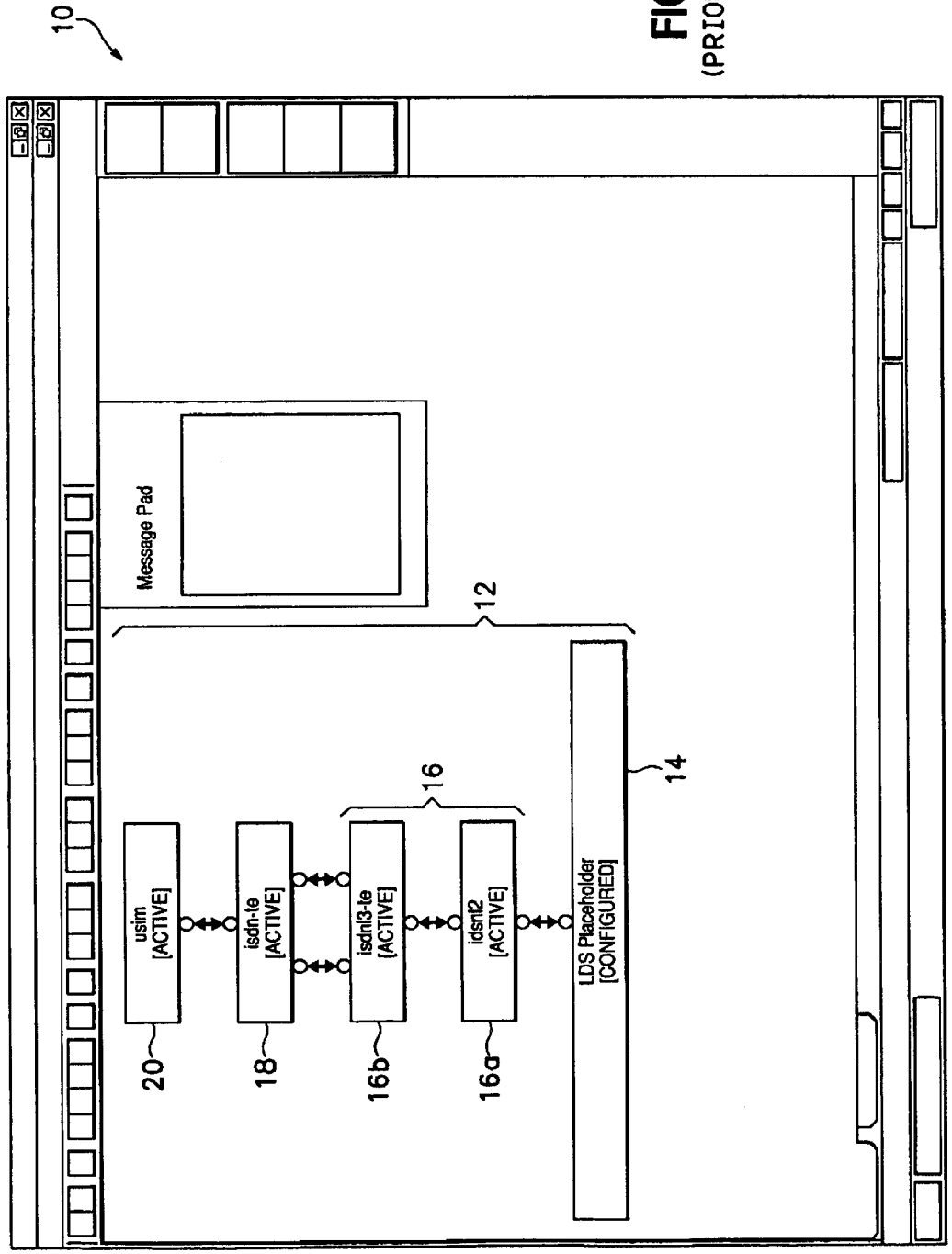
FIG. 1 is a plan view of a user interface of a test apparatus known from the state of the art.

The present invention is based on the finding that it is possible for a user to individually set up any test scenarios if, by way of a program code, said user is provided with correlated keywords that may be strung together for compiling a communication sequence, and if thereafter the program codes assigned to said individual keywords are linked to give an executable program. This measure allows setting up any test scenarios that may be used as part of automatic communication sequences for testing a communication network. With this measure it is particularly possible to also emulate test scenarios resulting from the mis-operation of a connected apparatus, as well as support services such as 'call waiting' or 'brokers call' and the like. Only through this measure is it possible to simulate terminal behavior that comes close to the behavior encountered in actual practice. The keywords include keywords for actions and keywords for trigger conditions, particularly timers. It is possible to change the timer setting per run by a specific time interval by making a corresponding entry into the entry mask.

The measure known from the state of the art tests a telecommunication network under a high load only in the case of two firmly specified scenarios. The manual entry mode does not take into account that on a telecommunication network a multitude of terminals are active at the same time with totally different actions. Only as described below is it possible to test a telecommunication network under conditions close to those encountered in actual practice. Only through this measure is it possible to draw real conclusions as to the performance of a telecommunication network. Considering the fact that, in case of an inadequate test, wrong findings may be made and it becomes possible for telecommunication terminals, which may cause the entire telecommunication network to collapse, to gain access, the measures described below avoid such grave problems.

In a preferred embodiment of the present method the keywords may be entered manually into an entry mask by a user via a keyboard. Preferably the keywords entered by the user are checked to see if they are part of the multitude of keywords provided and, if not, a corresponding signal is output to the user. This measure ensures that the user only enters keywords that are actually permitted. Moreover, it may also be envisaged that an automatic check of the syntax of the keywords entered occurs, i.e., to see if the compilation of the keywords is plausible. If the keywords compiled by the user do not make sense in the encountered form, such as onhook before offhook of a receiver, a corresponding signal is output to the user.

For further simplification it may be envisaged that the multitude of keywords provided are shown to the user in a selection window of a display device from where they may then be selected by said user, particularly by clicking or dragging, for compiling the communication sequence. Through this measure it is ensured that there is no misspelling or incorrect entry so that in this case checking of the words entered to see if they are part of the multitude of keywords provided may be dispensed with.

Preferably the communication sequence is designed to have a start scenario and/or a call scenario and/or a stop scenario, an initialization of the terminal being carried out in the start scenario, a communication sequence being carried out in the call scenario, and a terminal being put into a defined final state in the stop scenario. This subdivision allows a clear set-up of the communication sequence to be executed automatically, in particular it requires the actions for the start and/or the end of a test run, which are to be executed once only, to be programmed separately from the actions to be executed frequently in automatic.

For the test apparatus it is preferred that the communication sequence of at least one terminal, which may be entered by the user, is assigned to a user interface available in the test apparatus as a program code. Particularly in case of a protocol-specific design of the terminal layer, the user interface to be based on it allows simple programming of the communication sequence for test purposes.

The test apparatus may have one or, preferably, several terminals. In particular, several terminals may be simulated with a single user interface.

Entry of the keywords for compiling the communication sequence may occur separately for at least one terminal of the communication. This gives the opportunity to assign special actions to each terminal in the communication or at least individual terminals in the communication.

Particularly with respect to an automatic communication sequence, it is particularly advantageous if the entry of the keywords for compiling at least identical parts of communication sequences for at least two terminals in the communication may be effected by making it possible to enter in an entry mask the terminals to which the respective communication sequences should be applied. Specifying a single communication sequence allows assigning said communication sequence to a multitude of terminals, which allows realizing complex test conditions for testing a communication network.

Finally, a method for testing a communication network first connects the test apparatus to the telecommunication network, after which at least one terminal is emulated pursuant to the method described, and the executable program thus generated is started.

Figure 3:
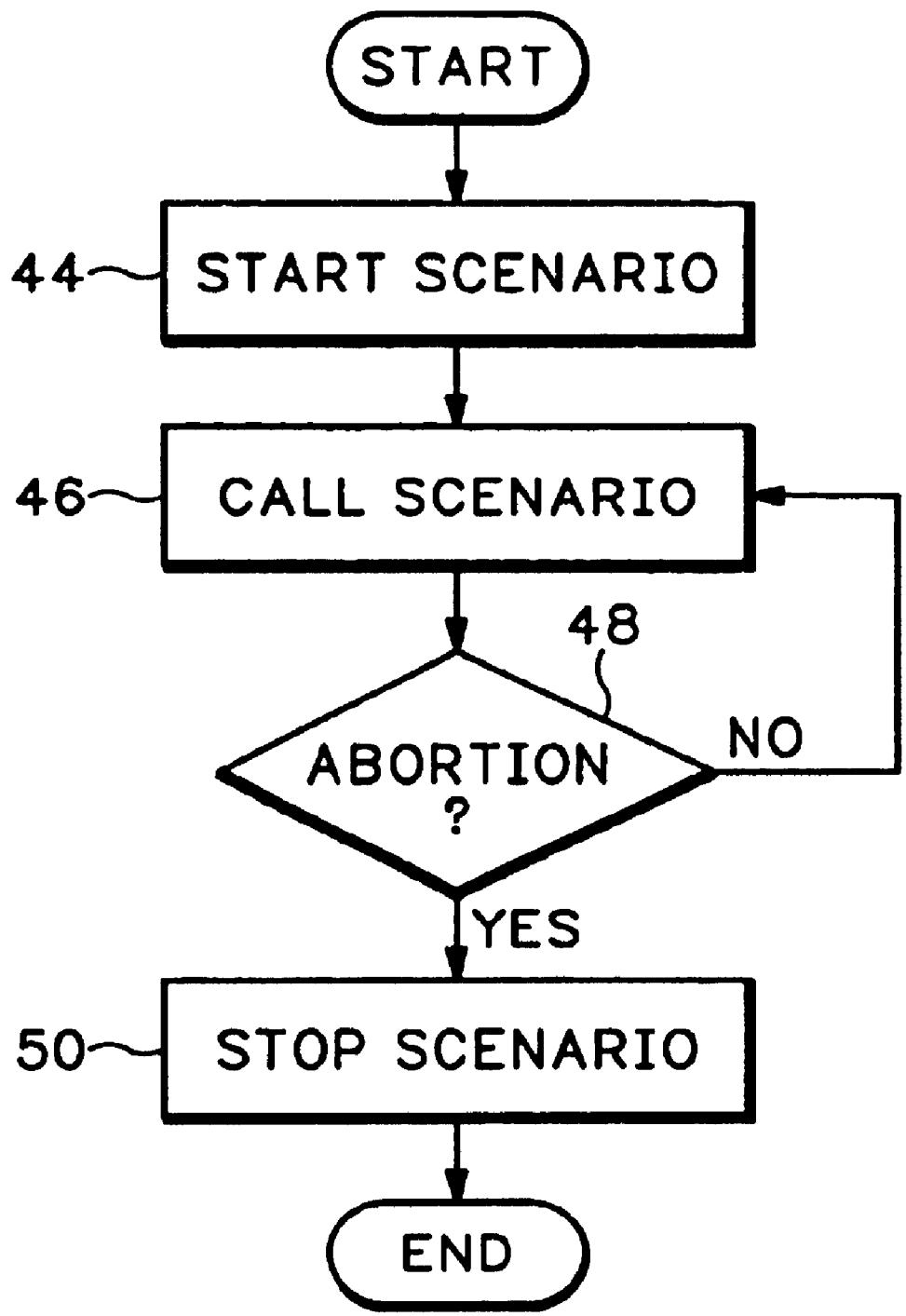
FIG. 3 is a sequence diagram for a communication sequence in an automatic mode according to the present invention.

Referring now to FIG. 3 the communication sequence in the automatic mode of a test apparatus is shown. After the start a start scenario 44 is first completed, in that the initialization of a terminal takes place, for example, through the command "attach" for a GPRS terminal layer or "location update" for a GSM terminal layer. After that in step 46 the so-called call scenario is completed in the automatic mode until the user initiates an abortion, as indicated in block 48. In other words as long as there is no abortion, step 46 is continuously repeated, while in case of an abortion the sequence changes to a stop scenario 50. In step 50 the terminal is brought to a defined final state, such as through the command "detach" for a GPRS terminal layer.

In an embodiment not shown it may also be envisaged to have the possibility to specify a numerical value and have step 46 completed as often as indicated by said numerical value.

Figure 4:
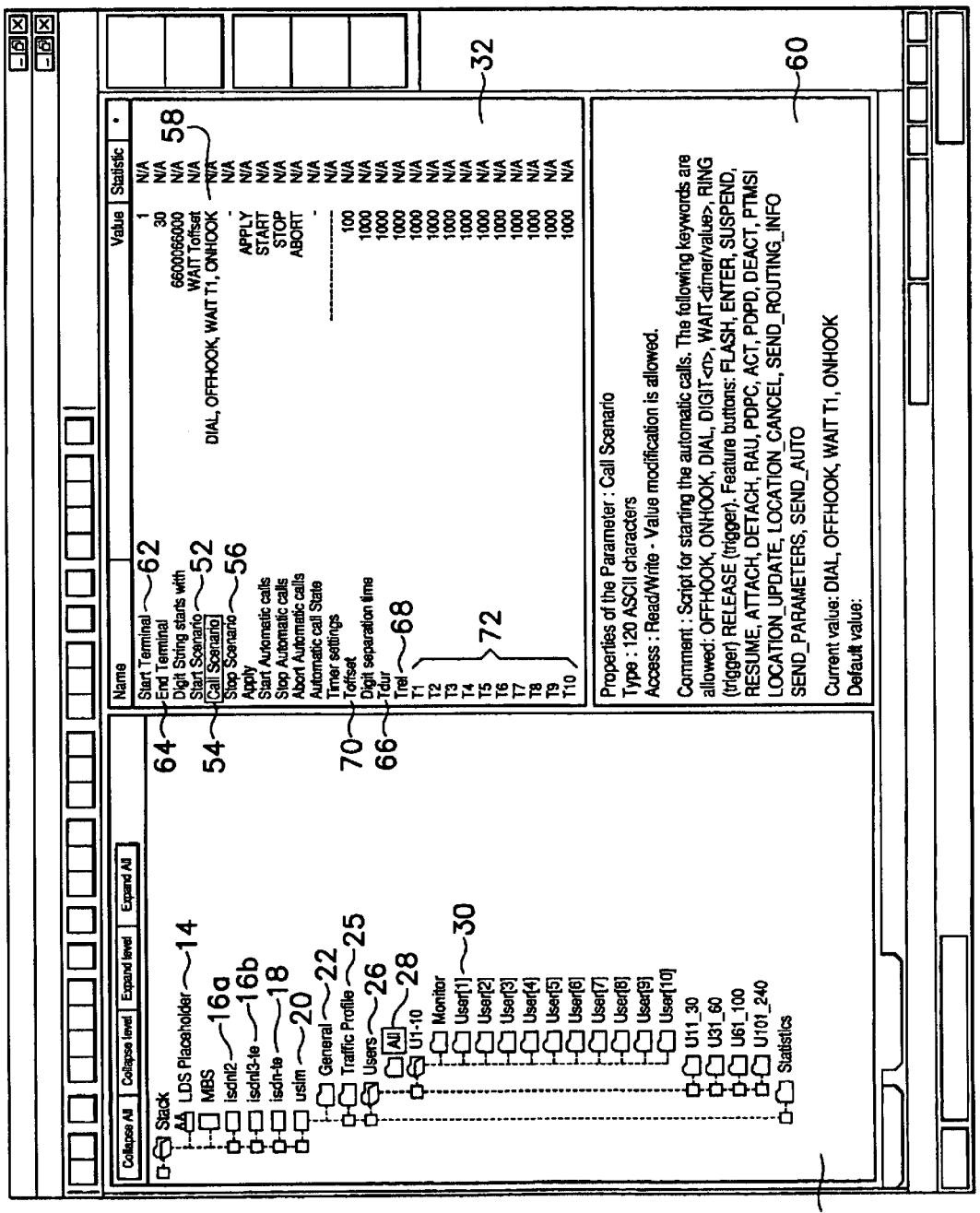
FIG. 4 is a plan view of another user interface of a test apparatus according to the present invention.

In display window 32 of FIG. 4 menu item 52 denotes the start scenario, menu item 54 the call scenario and menu item 56 the stop scenario. In the example shown, menu item 54 has a black background, which means that the entry mask is in the entry mode so that the user may enter the keywords into line 58 that belong to menu item 54. In doing so the user may select from keywords offered in a third display window 60. In the present case the user has manually entered the sequence "DIAL, OFFHOOK, WAIT T1, ONHOOK" into line 58. The black background of menu item 30 in display window 24 indicates that this is the communication sequence with which terminal 1 contributes to the communication on the telecommunication network to which the protocol tester is connected. As soon as the user enters a keyword into line 58, a check takes place automatically in the test apparatus to see if the keyword entered is one of the keywords offered in display window 60. If this is not the case, a corresponding signal is output to the user in window 60.

Example of a start scenario:
WAIT T1, ATTACH, WAIT 250
This realizes the following functions: first timer T1 is started. When the time span T1 has elapsed, the "attach" function is executed and a 250 ms timer is started. When the 250 ms have elapsed the call scenario is started.

1st example of a call scenario:
DIAL, OFFHOOK, WAIT Tdur, ONHOOK, WAIT T3
This scenario first executes the dial function, such as by dialling the number assigned to a "digit string" variable. This is followed by off-hooking which starts the Tdur timer and, when the time has elapsed, onhooking. Thereafter timer T3 is started and, when T3 has elapsed, the scenario starts once again to execute the dial function.

2nd example of a call scenario:
OFFHOOK, DIAL, WAIT Tdur, ONHOOK, WAIT T3

This scenario is similar to the first scenario. In this case, however, the numbers are dialled in an overlapping way. The time lag between the individual numbers may be specified in a "digit separation time" variable.

3rd example of a call scenario:
RING, OFFHOOK, RELEASE, ONHOOK
This is an example of an ending call. When the terminal rings, the receiver is lifted. Following the receipt of a release from the peer, i.e., the calling terminal is reset, the receiver is put down again.

Example of a stop scenario:
WAIT T7, DETACH
In this scenario the "detach" function is executed after the time of timer T7 has elapsed.

Table 1 is an example of a list of keywords which may be used in the present invention:

| Keyword | Description: |
| --- | --- |
| OFFHOOK | lift receiver |
| ONHOOK | put down receiver |
| DIAL | dial telephone number |
| DIGIT <N> | dial specific digit (0 . . . 9, *, #) |
| WAIT | wait for a defined time span in ms or a defined timer T1 to T10, Toffset, Trel, Tdur |
| RING | wait until terminal rings, trigger to answer calls |
| RELEASE | wait until terminal is released, e.g. trigger for putting receiver down |
| FLASH | flash function for analogue terminals |
| ENTER | enter, termination of an entry for ISDN terminals |
| SUSPEND | suspend function for ISDN terminals |
| RESUME | resume function for ISDN terminals |
| ATTACH | attach function for GPRS terminals |
| DETACH | detach function for GPRS terminals |
| RAU | rau function for GPRS terminals |
| PTMSI | P-TMSI reallocation for GPRS terminals |
| PDPC_ACT | PDPC activation for GPRS terminals |
| PDPC_DETACT | PDPC deactivation for GPRS terminals |
| PDPC_MODI | PDPC modification for GPRS terminals |
| DATA_SEND | send data |
| DATA_RECV | receive data |
| TOGGLE_PDPC | toggle PDPC for GPRS terminals |
| TOGGLE_POS | toggle position for GPRS terminals |
| RESET_SUBS | reset terminal |
| LOCATION_UPDATE | location update function for mobile terminals |
| LOCATION_CANCEL | location cancel function for mobile terminals |
| SEND_ROUTING_INFO | send routing info function for mobile terminals |
| SEND_PARAMETERS | send parameter function for mobile terminals |
| SEND_AUTH | send authentication function for mobile terminals |

The keywords listed in Table 1 are only to be understood as examples. Depending on the application, i.e., on the protocol used and/or the protocol layer to be emulated, other keywords may also be meaningful and useful, as is obvious to one skilled in the art.

Each of these keywords is assigned a program code. The program codes of several keywords are linked by a compiling device in the test apparatus following the completion of the entry to give an executable program.

Figure 2:
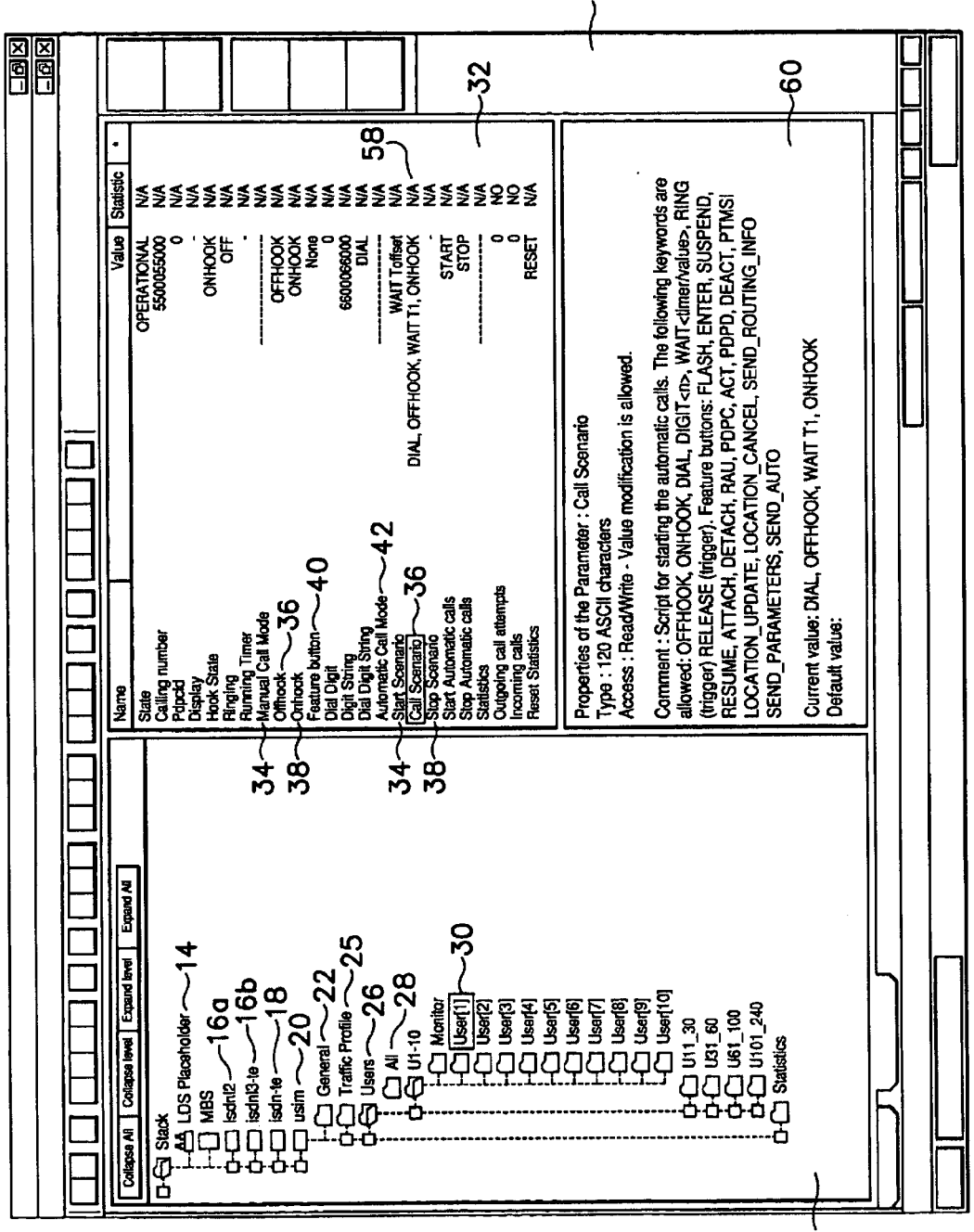
FIG. 2 is a plan view of a user interface of a test apparatus according to the present invention.

FIG. 4 also shows a Parameter View user interface of the test apparatus, with elements corresponding to FIG. 2 marked with the relevant reference marks. On the user interface of FIG. 4, menu item 28 has a dark background, which corresponds to an entry mode in which a multitude of terminals are assigned the same communication sequence. In window 32 menu item 62 defines that the communication sequence to be entered starts with terminal 1 and, according to menu item 64, ends with terminal 30. With the communication released, menu items 66 (tdur) and 68 (Trel) calculate and indicate the duration until a call is started and the time for ending a call, respectively. The timer, Toffset, specified with menu item 70 may be used for all scenarios in which a delay between the individual terminals is desired, such as by calculating the actual timer value via Toffset times the terminal number. In the menu items marked 72 further timers are made available.

Not shown is the possibility to increase a firm timer value, i.e., T1 or T2, by a certain time span per run.

In the present entry mode terminals 31 to 60, for example, may now in a next step be assigned another call scenario. Terminals 61 to 100 may be assigned any specific communication sequences selected, as is possible via the entry window shown in FIG. 2. In this way a terminal behavior that comes close to the behavior encountered in actual practice can be realized very well with the test apparatus.

What is claimed is:

1. A method of emulating a telecommunication terminal for testing a communication network, the telecommunication terminal being assigned a user interface programmable by a user for executing a communication sequence, the programming of the user interface comprising the steps of:

storing a multitude of keywords from which the communication sequence is compiled, a program code being correlated with each keyword;

displaying an entry mask on a display device into which the user enters a series of at least two keywords for compiling the communication sequence; and linking the program codes that are correlated with the keywords entered into the entry mask by the user to compile an executable program as the communication sequence.

2. The method according to claim 1 further comprising the step of entering the keywords manually by a user into the entry mask via a keyboard.

3. The method according to claim 2 further comprising the step of checking the keywords entered by the user to see if the keywords are part of the multitude of keywords and, if not, outputting a corresponding signal to the user.

4. The method according to claim 1 further comprising the step of showing the user in a selection window of the display device the multitude of keywords from whence the keywords are selected by the user.

5. The method according to any one of the claims 1–4 wherein the communication sequence comprises a start scenario and/or a call scenario and/or a stop scenario, an initialization of the telecommunication terminal being carried out in the start scenario, the communication sequence being carried out in the call scenario, and the telecommunication terminal being brought into a defined final state in the stop scenario.

6. A test apparatus for testing a telecommunication network by emulating a telecommunication terminal comprising:

a storage device in which keywords are filed from which a communication sequence for the telecommunication terminal is compiled for participation in a communication, a program code being correlated with each keyword;

a display device with an entry mask into which a user enters a series of at least two keywords for compiling the communication sequence; and a compiling device in which the program codes correlated with the keywords entered into the entry mask by the user are linked to compile an executable program as the communication sequence.

7. The test apparatus according to claim 6 wherein the telecommunication terminal assigned via the user interface comprises a plurality of telecommunication terminals.

8. The test apparatus according to claim 7 wherein each telecommunication terminal is assigned as a participant in the communication.

9. The test apparatus according to one of claim 7 or 8 wherein the entry of the keywords for compiling the communication sequence occurs separately for each telecommunication terminal.

10. The test apparatus according to claim 9 wherein the entry of the keywords for compiling a common communication sequence for at least two telecommunication terminals is effected by specifying in the entry mask the at least two telecommunication terminals to which the common communication sequence is to be applied.

* * * * *